United States Patent

[11] 3,560,646

[72] Inventor George L. Buc
Fairfax, Va.
[21] Appl. No. 811,272
[22] Filed Feb. 20, 1969
[45] Patented Feb. 2, 1971
[73] Assignee Farrington Electronics Incorporated
Springfield, Va.
a corporation of Massachusetts
Continuation of application Ser. No.
501,230, Oct. 22, 1965, now abandoned.

[54] READING DEVICE EMPLOYING AN ENCLOSURE FOR A LIGHT SOURCE AND THE DOCUMENT TO BE READ AND HAVING A HIGHLY LIGHT REFLECTIVE INTERNAL SURFACE
7 Claims, 1 Drawing Fig.

[52] U.S. Cl. 178/7.1
[51] Int. Cl. H04n 1/10
[50] Field of Search 178/7.1, 7.1E, 6.8; 340/149; 240/105

[56] References Cited

UNITED STATES PATENTS

| | | | |
|---|---|---|---|
| 1,897,219 | 2/1933 | Schroder | 178/7.1E |
| 3,039,080 | 6/1962 | King | 178/6.8 |
| 3,264,407 | 8/1966 | Headd et al. | 178/7.1 |

*Primary Examiner*—Richard Murray
*Assistant Examiner*—Alfred H. Eddleman
*Attorney*—Gerald J. Ferguson, Jr.

ABSTRACT: A reading device is disclosed wherein the document to be read is passed through one side of an enclosure, the side walls of which are provided with a highly light reflective surface. At the opposite side of the enclosure is provided a scanning light source such as produced by a cathode ray tube. Disposed within the disclosure is at least one light sensitive device such as a phototube for receiving the light which is reflected from the document. Because of the light reflective surface, the efficiency of the scanning operation is significantly increased.

PATENTED FEB 2 1971 3,560,646
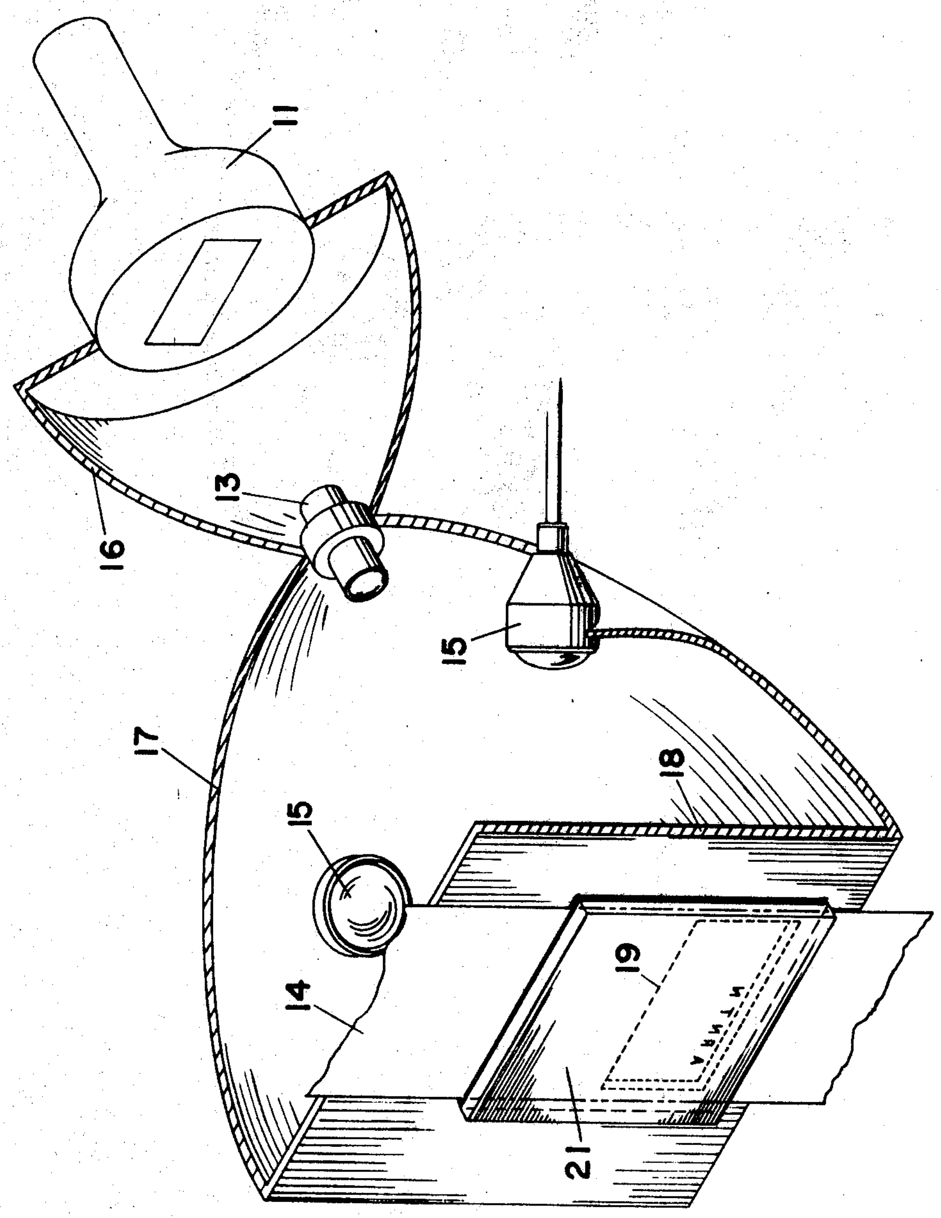
Inventor
George L. Buc
By Jacob Frank
Attorney

READING DEVICE EMPLOYING AN ENCLOSURE FOR A LIGHT SOURCE AND THE DOCUMENT TO BE READ AND HAVING A HIGHLY LIGHT REFLECTIVE INTERNAL SURFACE

BACKGROUND OF THE INVENTION

This application is a continuation of applicant's copending application Ser. No. 501,230, filed Oct. 22, 1965 (now abandoned) and entitled "A Reading Device Employing an Enclosure for a Light Source and the Document to be Read and Having a Highly Light Reflective Internal Surface."

The present invention relates in general to methods and apparatus for reading items of information such as handwritten characters, printed characters, and other intelligence bearing items, and more particularly to improvements in optical apparatus such as a cathode ray tube which scans items of information to be identified.

When employing cathode ray tube scanning apparatus in optical character recognition systems, considerable importance is given to the light flux behavior in the transmission of light from the cathode ray tube on to a document being scanned thence to a photomultiplier tube or like device for conversion to electrical energy, since it is by the light signal alone that the intelligence-bearing document may be read with a view to the identification of printed characters or the like on the document. Heretofore, many have used an enclosure in such scanning systems to prevent outside ambient light from exciting the photomultipliers, and the inner surfaces of the enclosure were painted or coated black to absorb the extraneous outside light which leaked into the enclosure.

While it is possible to achieve a sufficient degree of light intensity when utilizing cathode ray tubes for adequately scanning intelligence-bearing documents, certain disadvantages have been encountered whereby not only is the speed restricted but the economics of the system is effected. The scanning speed is restricted in that the rate at which scanning can be accomplished is fundamentally related to the value of the signal current available at the photomultiplier tube, and fluctuations in light values or the signal-to-noise ratio varies widely over small time increments due to various imperfect factors within the system such as an unconstant electron beam generator and imperfections in the layer of phosphorous coated on the face of the cathode ray tube etc. Therefore, in order to obviate the possibility of receiving low light values at short time intervals as a consequence of these fluctuations, a slower scanning speed is employed to average out the fluctuations over a longer time interval to present an overall signal having an increased signal-to-noise ratio. Insofar as the economics of the system is concerned, to achieve a desired light output in many instances the cathode ray tube is operated at above mean conditions, whereby normally the better than average performance is obtained only at the expense of a shortened life of the tube.

The general purpose of this invention is to provide an improved scanning system which embraces all of advantages of similarly employed devices yet possesses none of the aforedescribed disadvantages. To attain this, the present invention contemplates the provision of an enclosure between at least the document, lens and photomultiplier receiver of a cathode ray tube scanning system, wherein the inner surface of the enclosure is painted or coated white to present a highly reflective surface for bouncing reflecting light from the scanning spot of the document, resulting in an increased light collection efficiency at the photomultiplier. Thus, by having an increased electrical signal in response to the increased light value, increased scanning rates with the same equipment are possible, the life of a cathode ray tube could be increased by reducing its light output to operate at less stringent conditions, and/or a smaller lens might be employed in converging light rays from the cathode ray tube to the document.

An object of the present invention, therefore, is the provision of a novel method and apparatus in optical scanning systems for significantly increasing the light value intercepted by the photosensitive receiving member.

Another object of the present invention is to provide a novel method and apparatus in an enclosed optical scanning system for increasing the light collection efficiency to significantly increase the light value intercepted by the photosensitive receiver member.

Other objects, advantages and capabilities of the present invention will become apparent from the following detail description, taken in conjunction with the accompanying drawing, showing one preferred embodiment of the invention.

BRIEF DESCRIPTION OF THE DRAWING

FIG. 1 shows a general arrangement of the scanning means according to the invention.

DETAILED DESCRIPTION OF A PREFERRED EMBODIMENT OF THE INVENTION

Referring to the drawings wherein like reference characters designate corresponding parts, one form of the invention is shown in FIG. 1 wherein there is a series of light spots forming a portion of a scanning raster on the screen of a cathode ray tube 11 generated in a manner as is conventionally accomplished with such devices. The image of the cathode ray tube raster thus produced is projected through an optical system, comprising a lens 13, onto the character-bearing area of a document 14 and is normally adjusted to such a size that the vertical height of the scanning raster is greater than the tallest character to be scanned. The document 14 may be of the type that contains multiple lines of printing on separate sheets of paper or on continuous paper, or the document could be in the form of a card, whereas, in either event, suitable feed mechanisms well known in the art could be employed to advance the document past the scanning area. A pair of photomultiplier tubes 15 are placed about the document 14 to receive a portion of the reflected light impinging upon the focal spot at the document 14 normally causing a pulse of increased current.

To prevent outside light from additionally exciting the photomultipliers, enclosures 16 and 17, which might be of most any configurations are employed whereby the face 18 of enclosure 17 is provided with an aperture or transparent window 19 covered by a an overlapping plate 21 yet allowing sufficient space to exist between the face 18 and plate 21 for accepting a document 14 to be fed past window 19 and visually presented to the cathode ray tube for scanning purposes. One of the most important features of the present invention is the finishing given to the inner surfaces of enclosure 17 and face 18 which finishing is in the form of a white or highly reflective coloring which may be applied by a white paint, if desired. On the other hand, the inner surface of enclosure 16 is suitably finished to provide a surface preventing a glow therein and adding to the improved character contrast of the overall scanning system.

In operation, the scanning spots on the face of the cathode ray tube is imaged onto document 14 by a lens 13 and the light reflected from the document is detected by photomultiplier tubes 15 which generate current having a somewhat proportional relationship with the amount of light reflected from the document. Thus, the presence or absence of a rather dark-colored ink at any spot on the document is electrically encoded to indicate that information printed on the document. By having employed the highly reflective coating on the inner side of enclosure 17 and face 18 the light rays reflected from the scanning spot on the document 14 will continue to bounce about the highly reflective surfaces until they either are absorbed by the dark-printed information on the document reflected to the lens 13, or reflected to the photomultiplier tubes 15.

In view of the efficient use of most of the light reflected from the scanning spot on the document, the excitation of the photomultiplier tubes 15 is increased accordingly, thereby significantly increasing the current flow. In one test it has been found that when employing a hemispherical-shaped enclosure with a painted white inner surface, the signal intercepted by a photomultiplier was 2.6 times as more than when the same enclosure was black.

It should be understood, of course, that the foregoing disclosure relates to only a preferred embodiment of the invention and that numerous modifications or alterations may be made therein without departing from the spirit and the scope of the invention, it is desired, therefore, that only limitations be placed on the invention as are imposed by the prior art and as set forth in the appended claims.

I claim:

1. Scanning apparatus for use with automatic character sensing equipment and the like to scan areas of a character-bearing document at a reading station through which the document is fed comprising electronic tube scanning means for optically imaging on the character-bearing areas within the reading station a progressive scanning pattern of light energy to be advanced in successive patterns across the character-bearing area during advancement of the characters, electrical output producing means responsive to the reflected light originating in the scanning pattern and reflected from said area for detecting changes in the amount of light energy reflected from the character-bearing area, means for substantially enclosing a space common to at least a face of the electronic tube scanning means a face of the electrical output producing means and a portion of the character-bearing document at the reading station, the inner surface of said enclosure means comprising a highly reflective mat surface to significantly increase the light signal interrupted by said electrical output producing means responsive to light.

2. Scanning apparatus as in claim 1 where substantially all of said inner surface is covered with white paint.

3. Scanning apparatus for use with automatic character sensing equipment and the like to scan areas of a character-bearing document at a reading station through which the document is fed comprising optical scanning means for imaging on the character bearing areas within the reading station a progressive scanning pattern of light energy to be advanced in successive patterns across the character-bearing area during advancement of the characters, photocell means for producing output electrical signals bearing a selected relation to the light intensity to which the photocell means is exposed, means for substantially enclosing a space common to at least a part of the optical scanning means the photocell means and a portion of the character-bearing document at the reading station thereby exposing said photocell means to a portion of the reflecting light originating in the scanning patterns and reflected from the character-bearing area for detecting changes in the amount of light energy reflected from the character-bearing area, the inner surface of said enclosure means comprising a highly reflective mat surface to redirect on to the photocell means an increased portion of the reflecting light originating in the scanning patterns and reflected from the character-bearing area significantly increasing the electrical output signals of the photocell means.

4. Scanning apparatus as in claim 1 where substantially all of said inner surface is covered with white paint.

5. The combination recited in claim 4 wherein said optical scanning means comprises a cathode ray tube and focusing lens means.

6. Scanning apparatus for use with automatic character sensing equipment and the like to scan areas of a character-bearing document at a reading station through which the document is fed comprising cathode ray tube scanning means and a focusing lens for optically imaging on the character-bearing areas within the reading station a progressive scanning pattern of light energy to be advanced in successive patterns across the character-bearing area during advancement of the characters, photocell means for producing output electrical signals bearing a selected relation to the light intensity to which the photocell means is exposed, first enclosure means for substantially enclosing a space common to at least the focusing lens the photocell means and a portion of the character-bearing document at the reading station thereby exposing said photocell means to a portion of the reflecting light originating in the scanning patterns and reflected from the character-bearing area for detecting changes in the amount of light energy reflected from the character-bearing area to produce intercept and nonintercept scan signals respectively denoting the presence and absence or portions of the character intercepting scan pattern, second enclosure means for substantially enclosing a space common to at least the focusing lens and the face of the cathode ray tube and having a dark inner surface, the inner surface of said first enclosure means comprising a highly reflective mat surface to redirect on to the photocell means an increased portion of the reflecting light originating in the scanning patterns and reflected from the character-bearing area significantly increasing the electrical output signals of the photocell means.

7. Scanning apparatus as in claim 6 where substantially all of said inner surface is covered with white paint.